US012321187B2

(12) United States Patent
Fort

(10) Patent No.: US 12,321,187 B2
(45) Date of Patent: Jun. 3, 2025

(54) LOW DROPOUT VOLTAGE REGULATOR HAVING A TRANSISTOR ASSEMBLY

(71) Applicant: STMICROELECTRONICS (ROUSSET) SAS, Rousset (FR)

(72) Inventor: Jimmy Fort, Puyloubier (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 242 days.

(21) Appl. No.: 18/052,860

(22) Filed: Nov. 4, 2022

(65) Prior Publication Data

US 2023/0152832 A1 May 18, 2023

(30) Foreign Application Priority Data

Nov. 18, 2021 (FR) ...................................... 2112207

(51) Int. Cl.
*G05F 1/59* (2006.01)
*G05F 1/46* (2006.01)
*G05F 1/575* (2006.01)

(52) U.S. Cl.
CPC ................ *G05F 1/59* (2013.01); *G05F 1/468* (2013.01); *G05F 1/575* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 1/59
See application file for complete search history.

(56) References Cited

U.S. PATENT DOCUMENTS 6,005,378 A * 12/1999 D'Angelo .............. G11C 5/147 323/273
6,188,211 B1 * 2/2001 Rincon-Mora ......... G05F 1/575 323/280
6,246,221 B1 * 6/2001 Xi ........................... G05F 1/575 323/280
6,300,749 B1 * 10/2001 Castelli ................... G05F 1/575 323/276

(Continued)

FOREIGN PATENT DOCUMENTS

CN 103376816 A 10/2013
CN 105005351 A 10/2015

(Continued)

OTHER PUBLICATIONS

Man et al., "A High Slew-Rate Push-Pull Output Amplifier for Low-Quiescent Current Low-Dropout Regulators With Transient-Response Improvement", *IEEE Transactions on Circuits and Systems II: Express Briefs* 54(9):755-759, Sep. 2007.

(Continued)

*Primary Examiner* — Jeffrey A Gblende
(74) *Attorney, Agent, or Firm* — Seed IP Law Group LLP

(57) ABSTRACT

Provided is a voltage regulator supplying a first voltage on a first output node and comprising a first input transistor of a non-inverting stage and a second biasing transistor of the non-inverting stage. The first and second transistors are coupled in series, in this order, between the first node and a second node of application of a second reference voltage. The second transistor is being configured to be controlled by a third voltage depending on the first voltage.

20 Claims, 3 Drawing Sheets

(56) References Cited

U.S. PATENT DOCUMENTS

| | | | | |
|---|---|---|---|---|
| 6,710,583 | B2 * | 3/2004 | Stanescu | G05F 1/575 323/280 |
| 7,928,709 | B2 * | 4/2011 | Erbito, Jr. | G05F 1/56 323/317 |
| 10,152,072 | B1 | 12/2018 | Elhebeary et al. | |
| 10,591,938 | B1 | 3/2020 | Golara | |
| 11,300,985 | B2 | 4/2022 | Fort | |
| 2003/0102851 | A1 | 6/2003 | Stanescu et al. | |
| 2010/0090667 | A1 | 4/2010 | Gleason et al. | |
| 2015/0077183 | A1 | 3/2015 | Ciubotaru | |
| 2015/0355653 | A1 | 12/2015 | Drebinger et al. | |
| 2019/0235543 | A1 | 8/2019 | Chen et al. | |
| 2021/0124380 | A1 | 4/2021 | Fort | |
| 2021/0124384 | A1 | 4/2021 | Fort | |

FOREIGN PATENT DOCUMENTS

| | | | |
|---|---|---|---|
| CN | 107544613 | A | 1/2018 |
| CN | 109074110 | A | 12/2018 |
| CN | 112930506 | A | 6/2021 |
| CN | 213634248 | U | 7/2021 |
| EP | 3518070 | A1 | 7/2019 |

OTHER PUBLICATIONS

Manda et al., "A Multi-Loop Low-Dropout FVF Voltage Regulator with Enhanced Load Regulation (Invited Paper)", *2017 IEEE 60th International Midwest Symposium on Circuits and Systems* (*MWSCAS*), Boston, MA, USA, Aug. 6-9, 2017, pp. 9-12.

* cited by examiner 70
72
28
71
VOUT
12
18
VDD
14
GND
16
Vref
Vref
VB
VMP
VCP
VCN
VMN
IB

LOW DROPOUT VOLTAGE REGULATOR HAVING A TRANSISTOR ASSEMBLY

BACKGROUND

Technical Field

The present disclosure generally concerns electronic devices and, in particular, voltage regulators.

Description of the Related Art

A voltage regulator is an electronic component configured to hold a substantially constant voltage on its output. Voltage regulators may for example be linear regulators, that is, regulators relying on an active component operating in its linear area or on a passive component, such as a zener diode, operating in its reverse area.

A type of linear regulators corresponds to so-called low dropout (LDO) regulators. Regulators of this type are such that the output voltage is very close to the regulator power supply voltage.

BRIEF SUMMARY

An embodiment provides a voltage regulator supplying a first voltage on a first output node and comprising a first input transistor of a non-inverting stage and a second biasing transistor of the non-inverting stage, the first and second transistors being coupled in series, in this order, between the first node and a second node of application of a second reference voltage, the second transistor being configured to be controlled by a third voltage depending on the first voltage.

Another embodiment provides a method of controlling a voltage regulator supplying a first voltage on a first output node and comprising a first input transistor of a non-inverting stage and a second biasing transistor of the non-inverting stage, the first and second transistors being coupled in series between the first node and a second node of application of a second reference voltage, the second transistor being controlled by a third voltage depending on the first voltage.

According to an embodiment, the third voltage is configured to have the variation type, increasing or decreasing, opposite to that of the first voltage.

According to an embodiment, the first transistor is configured to be controlled by a fourth voltage depending on a fifth set point voltage.

According to an embodiment, the regulator comprises a third transistor coupled between a third node of application of a sixth power supply voltage and the first node.

According to an embodiment, a fourth junction node of the first and second transistors is coupled to the gate of the third transistor by the terminals of a fourth transistor.

According to an embodiment, the regulator comprises a circuit for generating the third voltage, receiving as an input the first voltage.

According to an embodiment, the generation circuit comprises fifth, sixth, and seventh transistors coupled in series, in this order, between the third and second nodes, the gate of the fifth transistor being coupled to the third node by the conduction terminals of an eighth transistor and to a fourth junction node of the sixth and seventh transistors by the conduction terminals of a ninth transistor.

According to an embodiment, the generation circuit comprises a tenth transistor configured to receive on its control terminal the first voltage, and being coupled, by its conduction terminals, between a fifth junction node of the fifth and sixth transistors and a sixth node, the generation circuit being configured to generate the third voltage on the sixth node.

According to an embodiment, the sixth node is coupled to the second node by eleventh and twelfth transistors coupled in series, in this order, the sixth node being coupled to the control terminal of the twelfth transistor.

According to an embodiment, the eleventh transistor is controlled by the same voltage as the ninth transistor.

According to an embodiment, the seventh, eighth, and ninth transistors are configured to be controlled by substantially constant voltages and the sixth transistor is configured to be controlled by the fifth voltage.

According to an embodiment, the regulator comprises a first resistor and thirteenth and fourteenth transistors coupled in series, in this order, between a seventh node of application of a set point current, and the second node, the seventh node being coupled to the gate of the thirteenth transistor and an eighth junction node of the thirteenth and fourteenth transistors being coupled to the gate of the fourteenth transistor, the regulator further comprising fifteenth and sixteenth transistors, a second resistor, and seventeenth and eighteenth transistors coupled in series, in this order, between the third and second nodes, a ninth junction node of the sixteenth node and of the second resistor being coupled to the gate of the fifteenth transistor, a tenth junction node of the second resistor and of the seventeenth transistor being coupled to the gate of the sixteenth transistor, the gate of the fifteenth transistor being coupled to the gate of the eighth transistor, the gate of the seventeenth transistor being coupled to the gate of the thirteenth, ninth, and eleventh transistors, the gate of the eighteenth transistor being coupled to the gate of the fourteenth and seventh transistors.

According to an embodiment, the first node is coupled to the fourth node by a first capacitor, and the fourth and fifth nodes are coupled by a second capacitor.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms “front,” “back,” “top,” “bottom,” “left,” “right,” etc., or to relative positional qualifiers, such as the terms “above,” “below,” “upper,” “lower,” etc., or to qualifiers of orientation, such as “horizontal,” “vertical,” etc., reference is made to the orientation shown in the figures.

Unless specified otherwise, the expressions “around,” “approximately,” “substantially” and “in the order of” signify within 10%, and preferably within 5%.

In the following description, all the described transistors are metal oxide semiconductor field-effect transistors (MOSFET).

Figure 1:
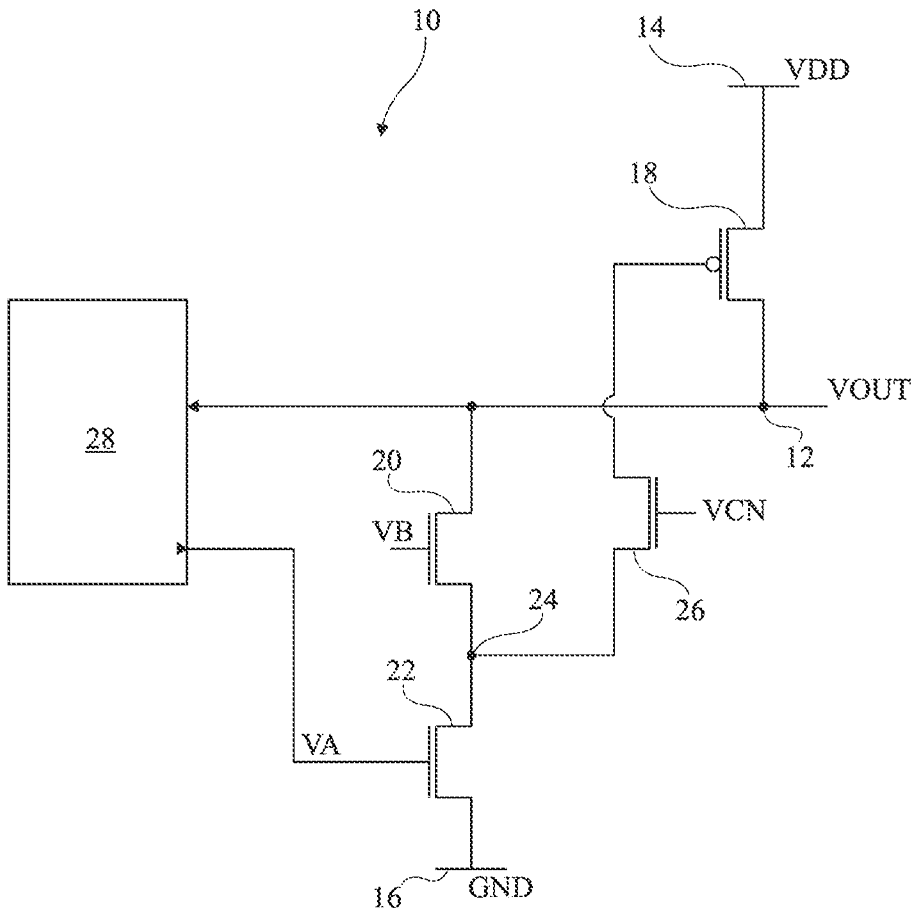
FIG. 1 schematically shows an embodiment of a low dropout regulator.

FIG. 1 schematically shows an embodiment of a low dropout regulator, or regulation circuit, 10.

Circuit 10 comprises an output node 12. Circuit 10 supplies on node 12 an output voltage VOUT. Circuit 10 further comprises an input node 14 having a power supply voltage VDD applied thereto. Circuit 10 further comprises an input node 16 having a reference voltage GND, for example, the ground, applied thereto. Output node 12 is for example coupled to a load, not shown, for example, a circuit powered with voltage VOUT.

Circuit 10 comprises a transistor 18. Transistor 18 is preferably a P-channel transistor. Transistor 18 is coupled between nodes 12 and 14. In other words, a conduction terminal, source or drain, preferably the source, is coupled, preferably connected, to node 14. Another conduction terminal, for example, the drain, of transistor 18 is coupled, preferably connected, to node 12.

Circuit 10 comprises transistors 20 and 22. Transistors 20 and 22 form a non-inverting stage, or non-inverting amplifier. Transistor 20 forms an input transistor of the non-inverting stage and transistor 22 forms a biasing transistor of the non-inverting stage. Transistor 22 biases the current flowing through transistor 20. Transistor 20 is preferably a P-channel transistor. Transistor 22 is preferably an N-channel transistor. Transistors 20 and 22 are series-coupled between nodes 12 and 16.

Transistor 20 is coupled between node 12 and a node 24. In other words, a conduction terminal of transistor 20, for example, the source, is coupled, preferably connected, to node 12. Another conduction terminal, for example, the drain, is coupled, preferably connected, to node 24. Transistor 20 is controlled by a voltage VB. In other words, the gate, or control terminal, of transistor 20 is coupled, preferably connected, to a node of application of voltage VB. Voltage VB is for example a voltage depending on the difference between output voltage VOUT and a reference voltage Vref0.

Transistor 22 is coupled between node 24 and node 16. In other words, a conduction terminal of transistor 22, for example, the drain, is coupled, preferably connected, to node 24. Another conduction terminal, for example, the source, is coupled, preferably connected, to node 16. Node 24 is thus a junction node of transistors 20 and 22. In other words, transistor 20 and 22 are coupled together by their conduction terminals via node 24.

Circuit 10 further comprises a transistor 26. Transistor 26 is for example an N-channel transistor. Transistor 26 is coupled between node 24 and the gate of transistor 18. In other words, a conduction terminal, for example, the drain, of transistor 26 is coupled, preferably connected, to the gate of transistor 18 and another conduction terminal, for example, the source, is coupled, preferably connected, to node 24. Transistor 26 is controlled by a voltage VCN. In other words, the gate of transistor 26 is coupled, preferably connected, to a node of application of voltage VCN. Voltage VCN is preferably substantially constant.

Circuit 10 further comprises a circuit 28 for generating the control voltage of transistor 22. Circuit 28 is configured to supply a control voltage VA to transistor 22. In other words, circuit 28 comprises an output, having voltage VA supplied thereon, coupled, preferably connected, to the gate of transistor 22. Circuit 28 comprises an input coupled, preferably connected, to node 12. Circuit 28 thus preferably receives output voltage VOUT.

Circuit 28 is configured so that voltage VA depends on voltage VOUT. More precisely, circuit 28 is configured so that voltage VA has variations of the type opposite to the variations of output voltage VOUT. Thus, when voltage VOUT is increasing, voltage VA is decreasing and when voltage VOUT is decreasing, voltage VA is increasing. Voltage VA is for example substantially constant and substantially equal to a value VA0 when the output voltage is constant and substantially equal to voltage Vref0. When voltage VOUT is greater than this voltage Vref0, voltage VA is smaller than voltage VA0. Similarly, when voltage VOUT is smaller than this voltage Vref0, voltage VA is greater than voltage VA0.

During the operation of circuit 10, the value of the current drawn by the load, not shown, on output node 12 may abruptly change. In other words, a current draw may occur on node 12. This thus causes a change of value of voltage VOUT. This change of value is then compensated for by circuit 10.

For example, if the load draws a more significant current, voltage VOUT decreases. This variation is transmitted, by transistor 20, to node 24, thus, the voltage on node 24 decreases. Circuit 28, receiving voltage VOUT, then supplies a voltage VA having this same variation. In this example, voltage VA increases. The increase in the control voltage of transistor 22 ensures that the current flowing through transistor 22 is greater and that the voltage on node 24 decreases faster.

The voltage variation is then transmitted to the gate of transistor 18 by transistor 26. The decrease in the gate voltage of transistor 18 ensures that the current between the conduction terminals of transistor 18 becomes more significant, which causes an increase in voltage VOUT, until voltage VOUT recovers a value substantially equal to the set point voltage, for example, voltage Vref0.

Similarly if the load draws a lower current, voltage VOUT increases. This variation is transmitted, by transistor 20, to node 24, thus, the voltage on node 24 increases. Circuit 28, receiving voltage VOUT, then supplies a voltage VA having this same variation. In this example, voltage VA decreases. The decrease in the control voltage of transistor 22 ensures that the current flowing through transistor 22 is lower and that the voltage on node 24 increases faster.

The voltage variation is then transmitted to the gate of transistor 18 by transistor 26. The increase in the gate voltage of transistor 18 ensures that the current between the conduction terminals of transistor 18 becomes lower, which causes a decrease in voltage VOUT, until voltage VOUT recovers a value substantially equal to the set point voltage, for example, voltage Vref0.

Preferably, the variation on voltage VA is inversely proportional to the variation on voltage VOUT. In other words, if voltage VOUT decreases by 10%, the increase in voltage VA is substantially equal to 10%.

It could have been chosen to maintain voltage VA at a constant value. However, the transmission of the variation at node 24, and thus the compensation of the variation of voltage VOUT, would then be slower. The voltage variation on the output node would be greater and there would then be more risks of damage to the components, for example, to the load.

Figure 2:
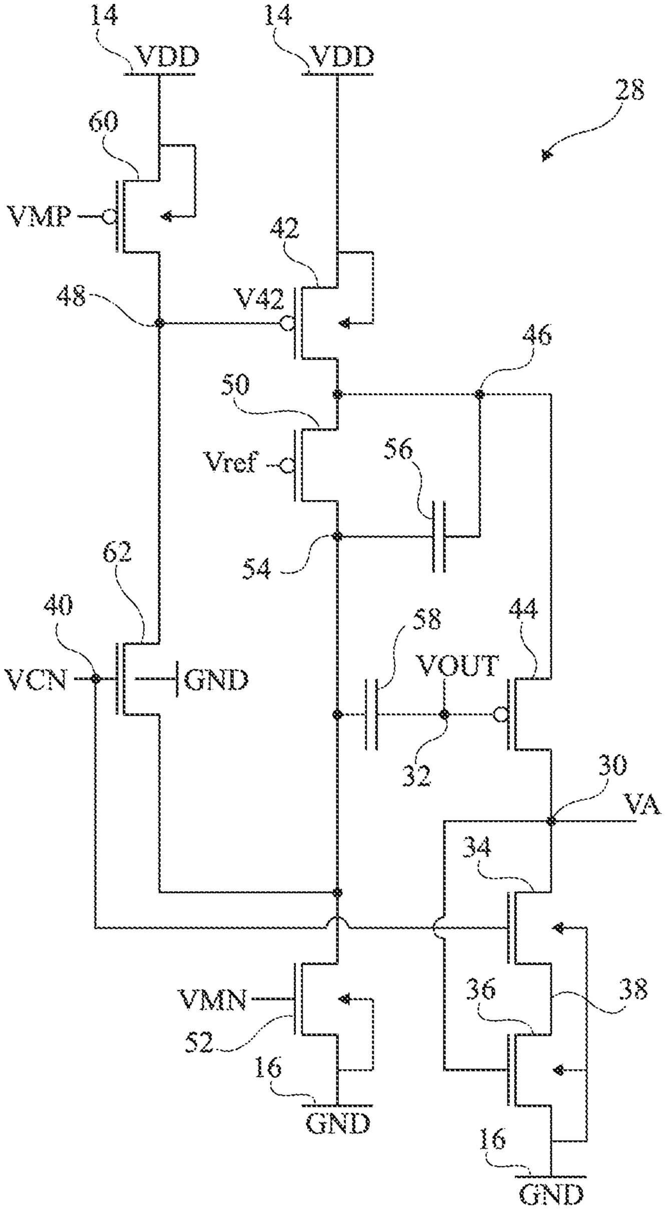
FIG. 2 shows in further detail a portion of the embodiment of FIG. 1.

FIG. 2 shows in further detail a portion of the embodiment of FIG. 1. More precisely, FIG. 2 shows an embodiment of the circuit 28 of FIG. 1.

Circuit 28 comprises an output node 30 having voltage VA applied thereto. Circuit 28 comprises an input node 32 having a voltage representing voltage VOUT applied thereto, preferably having voltage VOUT applied thereto. The circuit further receives, at its input, power supply and reference voltages VDD and GND. Circuit 28 is thus coupled to nodes 14 and 16.

Circuit 28 comprises transistors 34 and 36. Transistors 34 and 36 are for example N-channel transistors. Transistors 34 and 36 are coupled in series between node 30 and node 16.

Transistor 34 is coupled between node 30 and a node 38. In other words, a conduction terminal of transistor 34, for example, the drain, is coupled, preferably connected, to node 30 and another conduction terminal, for example, the source, of transistor 34 is coupled, preferably connected, to node 38. Transistor 34 is controlled by voltage VCN. In other words, the gate of transistor 34 is coupled, preferably connected, to a node 40 of application of control voltage VCN.

Transistor 36 is coupled between node 38 and node 16. In other words, a conduction terminal of transistor 36, for example, the drain, is coupled, preferably connected, to node 38 and another conduction terminal, for example, the source, of transistor 36 is coupled, preferably connected, to node 16. Transistor 36 is controlled by voltage VA. In other words, the gate of transistor 36 is coupled, preferably connected, to node 30.

Preferably, the substrates of transistors 34 and 36 are biased by voltage GND. In other words, the substrates of transistors 34 and 36 are coupled, preferably connected, to node 16.

Circuit 28 comprises transistors 42 and 44. Transistors 42 and 44 are for example P-channel transistors. Transistors 42 and 44 are series-coupled between node 14 and node 30.

Transistor 44 is coupled between node 30 and a node 46. In other words, a conduction terminal of transistor 44, for example, the drain, is coupled, preferably connected, to node 30 and another conduction terminal, for example, the source, of transistor 42 is coupled, preferably connected, to node 46. Transistor 42 is controlled by voltage VOUT. In other words, the gate of transistor 42 is coupled, preferably connected, to node 32.

Transistor 42 is coupled between node 46 and node 14. In other words, a conduction terminal of transistor 42, for example, the drain, is coupled, preferably connected, to node 46 and another conduction terminal, for example, the source, of transistor 42 is coupled, preferably connected, to node 14. Transistor 42 is controlled by a voltage V42. In other words, the gate of transistor 42 is coupled, preferably connected, to a node 48 of application of voltage V42.

Preferably, the substrate of transistor 42 is biased by voltage VDD. In other words, the substrate of transistor 42 is coupled, preferably connected, to node 14.

Circuit 28 comprises transistors 50 and 52. Transistors 50 and 52 are for example respectively a P-channel transistor and an N-channel transistor. Transistors 50 and 52 are series-coupled between node 46 and node 16. In other words, transistors 42, 50, and 52 are series-coupled between nodes 14 and 16.

Transistor 50 is coupled between node 46 and a node 54. In other words, a conduction terminal of transistor 50, for example, the source, is coupled, preferably connected, to node 46 and another conduction terminal, for example, the drain, of transistor 50 is coupled, preferably connected, to node 54. Transistor 50 is controlled by a set point voltage Vref. In other words, the gate of transistor 42 is coupled, preferably connected, to a node of application of voltage Vref. Preferably, voltage Vref is substantially equal to voltage Vref0 and is substantially equal to voltage VOUT.

Transistor 52 is coupled between node 54 and node 16. In other words, a conduction terminal of transistor 52, for example, the drain, is coupled, preferably connected, to node 54 and another conduction terminal, for example, the source, of transistor 52 is coupled, preferably connected, to node 16. Transistor 52 is controlled by a voltage VMN. In other words, the gate of transistor 52 is coupled, preferably connected, to a node of application of voltage VMN.

Preferably, the substrate of transistor 52 is biased by voltage GND. In other words, the substrate of transistor 52 is coupled, preferably connected, to node 16.

Circuit 28 for example comprises a capacitor 56 coupled between nodes 46 and 54. In other words, a terminal of capacitor 56 is coupled, preferably connected, to node 46 and another terminal of capacitor 56 is coupled, preferably connected, to node 54. Similarly, circuit 28 for example comprises a capacitor 58 coupled between nodes 54 and 32. In other words, a terminal of capacitor 58 is coupled, preferably connected, to node 32 and another terminal of capacitor 58 is coupled, preferably connected, to node 54.

Circuit 28 comprises transistors 60 and 62. Transistors 60 and 62 are for example respectively a P-channel transistor and an N-channel transistor. Transistors 60 and 62 are series-coupled between node 14 and node 54.

Transistor 60 is coupled between node 14 and node 48. In other words, a conduction terminal of transistor 60, for example, the source, is coupled, preferably connected, to node 14 and another conduction terminal, for example the drain, of transistor 60 is coupled, preferably connected, to node 48. Transistor 60 is controlled by a voltage VMP. In other words, the gate of transistor 60 is coupled, preferably connected, to a node of application of control voltage VMP.

Transistor 62 is coupled between node 48 and node 54. In other words, a conduction terminal of transistor 62, for example, the drain, is coupled, preferably connected, to node 48 and another conduction terminal, for example, the source, of transistor 62 is coupled, preferably connected, to node 54. Transistor 62 is controlled by voltage VCN. In other words, the gate of transistor 62 is coupled, preferably connected, to node 40.

Preferably, the substrates of transistors 60 and 62 are respectively biased by voltage VDD and voltage GND. In other words, the substrates of transistors 60 and 62 are coupled, preferably connected, respectively to node 14 and to node 16.

Voltages VMN and VMP are preferably substantially constant voltages.

Figure 3:
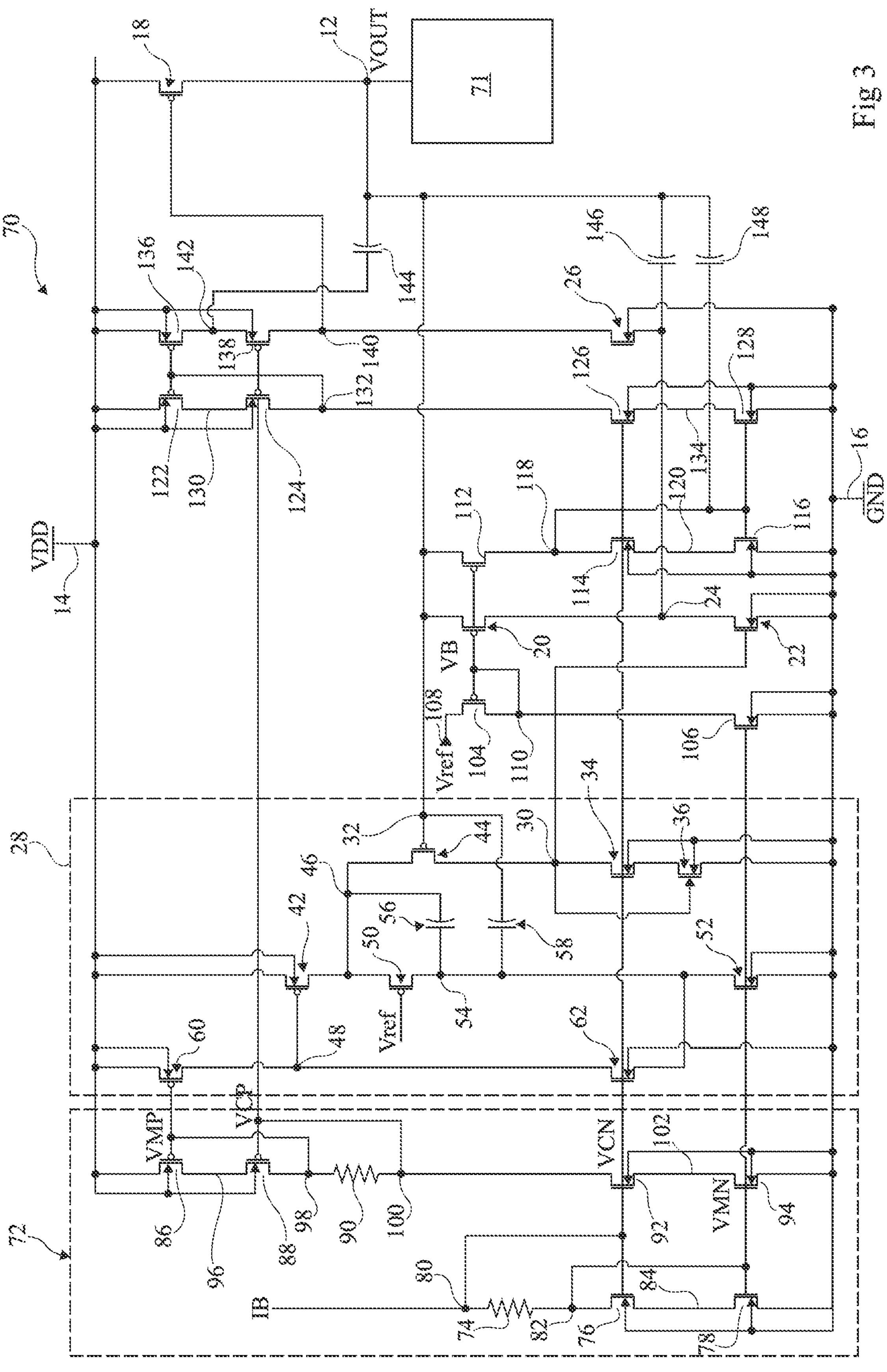
FIG. 3 shows a more detailed embodiment of a low dropout regulator.

FIG. 3 shows a more detailed embodiment of a low dropout regulator 70, or low dropout regulation circuit 70.

Circuit 70 for example powers a load 71. Thus, the output node 12 of circuit 70 is coupled, preferably connected, to load 71.

Regulator 70 comprises the elements of FIGS. 1 and 2. Thus, circuit 70 comprises circuit 28, such as described in relation with FIG. 2 and transistors 18, 20, 22, and 26 such as described in relation with FIG. 1. These elements will not be described again.

Regulator 70 comprises a voltage generation circuit 72. Circuit 72 is configured to generate voltages VMP, VMN, VCP and a voltage VCN. Voltages VMP, VMN, VCP, and VCN are preferably substantially constant voltages.

Circuit 72 comprises a resistor 74 and transistors 76 and 78 coupled in series. Resistor 74 and transistors 76 and 78 are series-coupled between a node 80 and node 16. Transistors 76 and 78 are preferably N-channel transistors. Transistors 76 and 78 are for example coupled in a cascode assembly.

Resistor 74 is coupled between node 80 and a node 82. In other words, a terminal of resistor 80 is coupled, preferably connected, to node 80 and another terminal of resistor 80 is coupled, preferably connected, to node 82.

Transistor 76 is coupled by its conduction terminals between node 82 and a node 84. In other words, a conduction terminal, for example, the drain, of transistor 76 is coupled, preferably connected, to node 82 and another conduction terminal, for example, the source, of transistor 76 is coupled, preferably connected, to node 84.

Transistor 78 is coupled between node 82 and node 84. In other words, a conduction terminal, for example, the drain, of transistor 78 is coupled, preferably connected, to node 84 and another conduction terminal, for example, the source, of transistor 78 is coupled, preferably connected, to node 16.

Node 80 receives a current IB. Current IB is for example substantially constant. Node 80 is for example coupled, preferably connected, to the gate of transistor 76. Node 82 is for example coupled, preferably connected, to the gate of transistor 78.

Preferably, the substrates of transistors 76 and 78 are biased by voltage GND. In other words, the substrates of transistors 76 and 78 are coupled, preferably connected, to node 16.

Circuit 72 further comprises transistors 86 and 88, a resistor 90, and transistors 92 and 94 coupled in series. Transistors 86 and 88, resistor 90, and transistors 92 and 94 are series-coupled between node 14 and node 16. Transistors 86 and 88 are for example P-channel transistors. Transistors 92 and 94 are for example N-channel transistors. Transistors 92 and 94 are for example coupled in a cascode assembly.

Transistor 86 is coupled by its conduction terminals between node 14 and a node 96. In other words, a conduction terminal, for example, the source, of transistor 86 is coupled, preferably connected, to node 14 and another conduction terminal, for example, the drain, of transistor 86 is coupled, preferably connected, to node 96.

Transistor 88 is coupled by its conduction terminals between node 96 and a node 98. In other words, a conduction terminal, for example, the source, of transistor 88 is coupled, preferably connected, to node 96 and another conduction terminal, for example, the drain, of transistor 88 is coupled, preferably connected, to node 98.

Resistor 90 is coupled between node 98 and a node 100. In other words, a terminal of resistor 90 is coupled, preferably connected, to node 98 and another terminal of resistor 90 is coupled, preferably connected, to node 100.

Preferably, the substrates of transistors 86 and 88 are biased by voltage VDD. In other words, the substrates of transistors 86 and 88 are coupled, preferably connected, to node 14.

Node 98 is for example coupled, preferably connected, to the gate of transistor 86. Node 100 is for example coupled, preferably connected, to the gate of transistor 88.

The voltage on the gate of transistor 86 is voltage VMP. Thus, voltage VMP is for example generated on node 98. The gate of transistor 86 is coupled, preferably connected, to the gate of the transistor 60 of circuit 28. Transistors 86 and 60 thus have a common gate. Transistors 86 and 60 are for example coupled as a current mirror.

The voltage on the gate of transistor 88 is voltage VCP. Thus, voltage VCP is for example generated on node 100.

Transistor 92 is coupled by its conduction terminals between node 100 and a node 102. In other words, a conduction terminal, for example, the drain, of transistor 92 is coupled, preferably connected, to node 100 and another conduction terminal, for example, the source, of transistor 92 is coupled, preferably connected, to node 102.

Transistor 94 is coupled by its conduction terminals between node 102 and node 16. In other words, a conduction terminal, for example, the drain, of transistor 94 is coupled, preferably connected, to node 102 and another conduction terminal, for example, the source, of transistor 94 is coupled, preferably connected, to node 16.

Preferably, the substrates of transistors 92 and 94 are biased by voltage GND. In other words, the substrates of transistors 92 and 94 are coupled, preferably connected, to node 16.

Voltage VCN is generated on the gate of transistor 92. The gate of transistor 92 is coupled, preferably connected, to the gate of transistor 76. The gate of transistor 92 is thus coupled, preferably connected, to node 80. Transistors 76 and 92 are for example coupled as a current mirror. The gate of transistor 92 is for example coupled, preferably connected, to the gate of transistor 62, to the gate of transistor 34, and to the gate of transistor 26.

Voltage VMN is generated on the gate of transistor 94. The gate of transistor 94 is coupled, preferably connected, to the gate of transistor 78. The gate of transistor 94 is thus coupled, preferably connected, to node 82. Transistors 78 and 94 are for example coupled as a current mirror. The gate of transistor 94 is for example coupled, preferably connected, to the gate of transistor 52.

Circuit 70 comprises transistors 104 and 106. Transistors 104 and 106 are respectively P- and N-channel transistors. Transistors 104 and 106 are series-coupled between a node 108 and node 16. Node 108 is a node of application of set point voltage Vref.

Transistor 104 is coupled between nodes 108 and 110. In other words, a conduction terminal, for example the source, of transistor 104 is coupled, preferably connected, to node 108 and another conduction terminal, for example the drain, of transistor 104 is coupled, preferably connected, to node 110. Transistor 104 is for example diode-assembled. The gate of transistor 104 is thus coupled, preferably connected, to the gate of transistor 104.

Voltage VB is generated on the gate of transistor 104. The gate of transistor 104 is coupled, preferably connected, to the gate of transistor 20. The gate of transistor 20 is thus coupled, preferably connected, to node 110.

As a variant, transistor 104 may be replaced with a circuit comprising an operational amplifier.

Transistor 106 is coupled between node 110 and node 16. In other words, a conduction terminal, for example, the drain, of transistor 106 is coupled, preferably connected, to node 110 and another conduction terminal, for example, the source, of transistor 106 is coupled, preferably connected, to node 16.

Transistor 106 is controlled by voltage VMN. In other words, the gate of transistor 106 is coupled, preferably connected, to the gates of transistor 52, 78, and 94. Transistor 106 is thus coupled as a current mirror with transistor 78.

Circuit 70 comprises transistors 112, 114, 116 series-coupled between node 32 and node 16. Transistor 112 is for example a P-channel transistor. Transistors 114 and 116 are for example N-channel transistors.

Transistor 112 is coupled between node 32 and a node 118. In other words, a conduction terminal, for example, the source, of transistor 112 is coupled, preferably connected, to node 32 and another conduction terminal, for example, the drain, of transistor 112 is coupled, preferably connected, to node 118.

Transistor 112 is controlled by voltage VB. The gate of transistor 112 is coupled, preferably connected, to the gates of transistors 20 and 104.

Transistor 114 is coupled between node 118 and a node 120. In other words, a conduction terminal, for example, the drain, of transistor 114 is coupled, preferably connected, to node 118 and another conduction terminal, for example, the source, of transistor 114 is coupled, preferably connected, to node 120.

Transistor 114 is controlled by voltage VCN. In other words, the gate of transistor 114 is coupled, preferably connected, to the gates of transistors 26, 34, 62, 76, 92.

Transistor 116 is coupled between node 120 and node 16. In other words, a conduction terminal, for example, the drain, of transistor 116 is coupled, preferably connected, to node 120 and another conduction terminal, for example, the source, of transistor 116 is coupled, preferably connected, to node 16. The gate of transistor 116 is for example coupled, preferably connected, to node 118.

Preferably, the substrates of transistors 114 and 116 are biased by voltage GND. In other words, the substrates of transistors 114 and 116 are coupled, preferably connected, to node 16.

Circuit 70 further comprises transistors 122, 124, 126, 128. Transistors 122, 124, 126, 128 are series-coupled between nodes 14 and 16. Transistors 122 and 124 are for example P-channel transistors. Transistors 126 and 128 are for example N-channel transistors.

Transistor 122 is coupled between node 14 and a node 130. In other words, a conduction terminal, for example, the source, of transistor 122 is coupled, preferably connected, to node 14 and another conduction terminal, for example the drain, of transistor 122 is coupled, preferably connected, to node 130.

Transistor 124 is coupled between node 130 and a node 132. In other words, a conduction terminal, for example, the source, of transistor 124 is coupled, preferably connected, to node 130 and another conduction terminal, for example the drain, of transistor 124 is coupled, preferably connected, to node 132.

Transistor 124 is controlled by voltage VCP. In other words, the gate of transistor 124 is coupled, preferably connected, to the gate of transistor 88.

Further, the gate of transistor 122 is preferably coupled, preferably connected, to node 132. Transistor 126 is coupled between node 132 and a node 134. In other words, a conduction terminal, for example, the drain, of transistor 126 is coupled, preferably connected, to node 132 and another conduction terminal, for example, the source, of transistor 126 is coupled, preferably connected, to node 134.

Transistor 126 is controlled by voltage VCN. The gate of transistor 126 is for example coupled, preferably connected, to the gates of transistors 26, 34, 62, 76, and 114.

Transistor 128 is coupled between node 134 and node 16. In other words, a conduction terminal, for example, the drain, of transistor 128 is coupled, preferably connected, to node 134 and another conduction terminal, for example, the source, of transistor 128 is coupled, preferably connected, to node 16.

The gate of transistor 128 is coupled, preferably connected, to transistor 116. Transistors 116 and 128 thus have a common gate. The gate of transistor 128 is for example coupled, preferably connected, to node 118.

Preferably, the substrates of transistors 122 and 124 are biased by voltage VDD. In other words, the substrates of transistors 122 and 124 are coupled, preferably connected, to node 14. Preferably, the substrates of transistors 126 and 128 are biased by voltage GND. In other words, the substrates of transistors 126 and 128 are coupled, preferably connected, to node 16.

Transistors 114, 116, 126, 128 are thus coupled in a cascode current mirror assembly.

Circuit 70 comprises transistors 136 and 138. Transistors 136 and 138 are series-coupled between node 14 and a node 140.

Transistor 136 is coupled between node 14 and a node 142. In other words, a conduction terminal, for example, the source, of transistor 136 is coupled, preferably connected, to node 14 and another conduction terminal, for example the drain, of transistor 136 is coupled, preferably connected, to node 142.

The gate of transistor 136 is coupled, preferably connected, to the gate of transistor 122. In other words, transistors 122 and 136 have a common gate. The gate of transistor 136 is thus coupled, preferably connected, to node 132.

Transistor 138 is thus coupled between node 142 and node 140. In other words, a conduction terminal, for example the source, of transistor 138 is coupled, preferably connected, to node 142 and another conduction terminal, for example, the drain, of transistor 138 is coupled, preferably connected, to node 140.

Transistor 138 is controlled by voltage VCP. The gate of transistor 138 is thus coupled, preferably connected, to a node of application of voltage VCP. The gate of transistor 138 is for example coupled, preferably connected, to the gates of transistors 88 and 124.

Transistors 122, 124, 136, and 138 are thus coupled in a cascode current mirror assembly.

Node 140 is further coupled, preferably connected, to the gate of transistor 18. Node 140 is further coupled, preferably connected, to a conduction terminal, for example, the drain, of transistor 126. A conduction terminal, for example, the drain, of transistor 126 is thus coupled, preferably connected, to the gate of transistor 18 via node 140.

According to an embodiment, circuit 70 further comprises capacitors 144, 146, and 148.

Capacitor 144 is coupled between node 12 and node 140. In other words, a terminal of capacitor 144 is coupled, preferably connected, to node 12 and another terminal of capacitor 144 is coupled, preferably connected, to node 140.

Capacitor 146 is coupled between node 12 and node 24. In other words, a terminal of capacitor 146 is coupled, preferably connected, to node 12 and another terminal of capacitor 146 is coupled, preferably connected, to node 24.

Capacitor 148 is coupled between node 12 and node 118. In other words, a terminal of capacitor 148 is coupled, preferably connected, to node 12 and another terminal of capacitor 148 is coupled, preferably connected, to node 118.

Capacitors 144, 146, and 148 are for example so-called Miller capacitive elements. Capacitors 144, 146, and 148 thus enable to improve the speed of the response to a current draw.

An advantage of the described embodiments is that circuit 10 or 70 has a faster response to a current draw from the load.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

Voltage regulator (10, 70) supplying a first voltage (VOUT) on a first output node (12) and may be summarized as including a first input transistor (20) of a non-inverting stage and a second biasing transistor (22) of the non-inverting stage, the first and second transistors (20, 22) being coupled in series, in this order, between the first node (12) and a second node (16) of application of a second reference voltage (GND), the second transistor (22) being configured to be controlled by a third voltage (VA) depending on the first voltage (VOUT).

Method of controlling a voltage regulator (10, 70) supplying a first voltage (VOUT) on a first output node (12) and may be summarized as including a first input transistor (20) of a non-inverting stage and a second biasing transistor (22) of the non-inverting stage, the first and second transistors (20, 22) being coupled in series between the first node (12) and a second node (16) of application of a second reference voltage (GND), the second transistor (22) being controlled by a third voltage (VA) depending on the first voltage (VOUT).

The third voltage (VA) may be configured to have the variation type, increasing or decreasing, opposite to that of the first voltage (VOUT).

The first transistor (20) may be configured to be controlled by a fourth voltage (VB) depending on a fifth set point voltage (Vref)

The regulator may include a third transistor (18) coupled between a third node of application of a sixth power supply voltage (VDD) and the first node (12).

A fourth junction node (24) of the first and second transistors (20, 22) may be coupled to the gate of the third transistor (18) by the terminals of a fourth transistor (26).

The regulator (10, 70) may include a circuit (28) for generating the third voltage (VA), receiving as an input the first voltage (VOUT).

The generation circuit (28) may include fifth (42), sixth (50), and seventh (52) transistors coupled in series, in this order, between the third (14) and second (16) nodes, the gate of the fifth transistor (42) being coupled to the third node (14) by the conduction terminals of an eighth transistor (60) and to a fourth junction node (54) of the sixth (50) and seventh (52) transistors by the conduction terminals of a ninth transistor (62).

The generation circuit may include a tenth transistor (44) configured to receive on its control terminal the first voltage (VOUT), and being coupled, by its conduction terminals, between a fifth junction node (46) of the fifth (42) and sixth (50) transistors and a sixth node (30), the generation circuit being configured to generate the third voltage (VA) on the sixth node (30).

The sixth node (30) may be coupled to the second node (16) by eleventh (34) and twelfth (36) transistors coupled in series, in this order, the sixth node (30) being coupled to the control terminal of the twelfth transistor (36).

The eleventh transistor (34) may be controlled by the same voltage as the ninth transistor (62).

The seventh (52), eighth (60), and ninth (62) transistors may be configured to be controlled by substantially constant voltages and the sixth transistor (50) is configured to be controlled by the fifth voltage (Vref).

The regulator may include a first resistor (74) and thirteenth (76) and fourteenth (78) transistors coupled in series, in this order, between a seventh node (80) of application of a set point current (IB), and the second node (16), the seventh node (80) being coupled to the gate of the thirteenth transistor (76) and an eighth junction node (84) of the thirteenth (76) and fourteenth (78) transistors being coupled to the gate of the fourteenth transistor (78), the regulator may further include fifteenth (86) and sixteenth (88) transistors, a second resistor (90), and seventeenth (92) and eighteenth (94) transistors coupled in series, in this order, between the third (14) and second (16) nodes, a ninth junction node (98) of the sixteenth node (88) and of the second resistor (90) being coupled to the gate of the fifteenth transistor (86), a tenth junction node (100) of the second resistor (90) and of the seventeenth transistor (92) being coupled to the gate of the sixteenth transistor (88), the gate of the fifteenth transistor (86) being coupled to the gate of the eighth transistor (60), the gate of the seventeenth transistor (92) being coupled to the gate of the thirteenth (76), ninth (62), and eleventh (34) transistors, the gate of the eighteenth transistor (94) being coupled to the gate of the fourteenth (78) and seventh (52) transistors.

The first node may be coupled to the fourth node (54) by a first capacitor (56), and the fourth (54) and fifth (46) nodes are coupled by a second capacitor (58).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A voltage regulator, comprising:
- a first node configured to be supplied by a first voltage from the voltage regulator;
- a second node configured to provide a second voltage, the second voltage being a reference voltage; and
- a non-inverting stage including:
  - a first transistor having:
    - a first conduction terminal coupled to the first node, wherein the first conduction terminal is one of a source or drain terminal of the first transistor,
    - a second conduction terminal, wherein the second conduction terminal is another of the source or drain terminal of the first transistor, and
    - a control terminal; and
  - a second transistor having:
    - a first conduction terminal coupled to the second conduction terminal of the first transistor,
    - a second conduction terminal coupled to the second node, and
    - a control terminal to be controlled by a third voltage that depends on the first voltage.

2. The voltage regulator according to claim 1, wherein the third voltage is negatively correlated with the first voltage.

3. The voltage regulator according to claim 2, wherein the third voltage increases in response to a decrease in the first voltage and the third voltage decreases in response to an increase in the first voltage.

4. The voltage regulator according to claim 1, wherein the first transistor has a control terminal configured to be controlled by a fourth voltage, wherein the fourth voltage depends on a fifth voltage that is a set point voltage.

5. The voltage regulator according to claim 1, comprising:
- a third transistor having:
  - a first conduction terminal coupled to a third node, wherein the third node supplies a power supply voltage;
  - a second conduction terminal coupled to the first node; and
  - a control terminal.

6. The voltage regulator according to claim 5, wherein the second conduction terminal of the first transistor and the first conduction terminal of the second transistor are coupled to the control terminal of the third transistor via intervening first and second conduction terminals of a fourth transistor.

7. The voltage regulator according to claim 1, comprising:
- a circuit configured to:
  - generate the third voltage; and
  - receive the first voltage.

8. The voltage regulator according to claim 7, wherein the circuit includes:
- a fifth transistor having a first conduction terminal coupled to a third node, a second conduction terminal and a control terminal;
- a sixth transistor having a first conduction terminal coupled to the second conduction terminal of the fifth transistor and having a second conduction terminal;
- a seventh transistor having a first conduction terminal coupled to the second conduction terminal of the sixth transistor and having a second conduction terminal coupled to the second node;
- an eighth transistor having a first conduction terminal coupled to the control terminal of the fifth transistor and a second conduction terminal coupled to the third node; and
- a ninth transistor having a first conduction terminal coupled to the control terminal of the fifth transistor and a second conduction terminal coupled to the second conduction terminal of the sixth transistor and the first conduction terminal of the seventh transistor.

9. The voltage regulator according to claim 8, wherein the circuit includes:
- a tenth transistor having a control terminal configured to receive the first voltage, a first conduction terminal coupled to the second conduction terminal of the fifth transistor and the first conduction terminal of the sixth transistor and a second conduction terminal coupled to a sixth node, wherein the sixth node provides the third voltage.

10. The voltage regulator according to claim 9, wherein the circuit includes:
- an eleventh transistor having a first conduction terminal coupled to the sixth node and a second conduction terminal; and
- a twelfth transistor having a first conduction terminal coupled to the second conduction terminal of the eleventh transistor, a second conduction terminal coupled to the second node and a control terminal coupled to the sixth node.

11. The voltage regulator according to claim 10, wherein the eleventh transistor has a control terminal coupled a control terminal of the ninth transistor, and wherein the eleventh transistor and the ninth transistor are controlled by the same voltage.

12. The voltage regulator according to claim 8, wherein the seventh, eighth, and ninth transistors are configured to be controlled by substantially constant voltages and the sixth transistor is configured to be controlled by a fifth voltage.

13. The voltage regulator according to claim 10, comprising:
- a first resistor;
- thirteenth and fourteenth transistors coupled in series between a seventh node and the second node, wherein the seventh node provides a set point current and the seventh node is coupled to a control terminal of the thirteenth transistor and an eighth junction node of the thirteenth and fourteenth transistors being coupled to a control terminal of the fourteenth transistor;
- fifteenth and sixteenth transistors;
- a second resistor; and
- seventeenth and eighteenth transistors coupled in series between the third and second nodes, a ninth junction node of the sixteenth transistor and of the second resistor being coupled to a control terminal of the fifteenth transistor, a tenth junction node of the second resistor and of the seventeenth transistor being coupled to a control terminal of the sixteenth transistor, the control terminal of the fifteenth transistor being coupled to a control terminal of the eighth transistor, a control terminal of the seventeenth transistor being coupled to the control terminals of the thirteenth, ninth, and eleventh transistors, and a control terminal of the eighteenth transistor being coupled to the control terminals of the fourteenth and seventh transistors.

14. The voltage regulator according to claim 8, wherein the first node is coupled to a fourth node by a first capacitor, and the fourth and fifth nodes are coupled by a second capacitor.

15. A method of controlling a voltage regulator, comprising:
- supplying, by the voltage regulator, a first voltage to a first node, wherein a first transistor of a non-inverting stage and a second transistor of the non-inverting stage are coupled in series between the first node and a second node, wherein:
  - the first transistor has a first conduction terminal coupled to the first node, wherein the first conduction terminal is one of a source or drain terminal of the first transistor,
  - the first transistor has a second conduction terminal, wherein the second conduction terminal is another of the source or drain terminal of the first transistor,
  - the first transistor has a control terminal,
  - the second transistor has a first conduction terminal coupled to the second conduction terminal of the first transistor,
  - the second transistor has a second conduction terminal coupled to the second node, and
  - the second transistor has a control terminal to be controlled by a third voltage;
- supplying a reference voltage to the second node; and
- controlling the second transistor by the third voltage that depends on the first voltage.

16. The method according to claim 15, wherein the third voltage is negatively correlated with the first voltage.

17. The method according to claim 16, wherein the third voltage increases in response to a decrease in the first voltage and the third voltage decreases in response to an increase in the first voltage.

18. The method according to claim 15, comprising:

controlling the first transistor by a fourth voltage, wherein the fourth voltage depends on a fifth voltage that is a set point voltage.

19. The method according to claim 15, wherein a third transistor has a first conduction terminal coupled to a third node, wherein the third node supplies a power supply voltage, and wherein the third transistor has a second conduction terminal coupled to the first node and a control terminal.

20. The method according to claim 19, wherein the second conduction terminal of the first transistor and the first conduction terminal of the second transistor are coupled to the control terminal of the third transistor via intervening first and second conduction terminals of a fourth transistor.

* * * * *